United States Patent
Leshchiner et al.

(10) Patent No.: US 8,732,320 B2
(45) Date of Patent: May 20, 2014

(54) FAST CONTENT-BASED ROUTING

(75) Inventors: Dan Leshchiner, Sunnyvale, CA (US); Balbhim Mahurka, Santa Clara, CA (US); Russell Selph, Palo Alto, CA (US)

(73) Assignee: TIBCO Software Inc., Palo Alto, CA (US)

( * ) Notice: Subject to any disclaimer, the term of this patent is extended or adjusted under 35 U.S.C. 154(b) by 0 days.

(21) Appl. No.: 13/298,232

(22) Filed: Nov. 16, 2011

(65) Prior Publication Data

US 2012/0265899 A1 Oct. 18, 2012

Related U.S. Application Data

(60) Provisional application No. 61/538,645, filed on Sep. 23, 2011, provisional application No. 61/414,327, filed on Nov. 16, 2010.

(51) Int. Cl.
*G06F 15/16* (2006.01)

(52) U.S. Cl.
USPC ............ 709/228; 370/389; 370/390; 370/466

(58) Field of Classification Search
USPC .......................................... 709/238
See application file for complete search history.

(56) References Cited

U.S. PATENT DOCUMENTS

| | | | | |
|---|---|---|---|---|
| 7,039,050 B1 * | 5/2006 | Mutreja | ......... | 370/389 |
| 7,680,951 B1 | 3/2010 | Kulik | | |
| 2006/0165053 A1 * | 7/2006 | Bhatnagar et al. | ............ | 370/351 |
| 2008/0285578 A1 | 11/2008 | Delay et al. | | |
| 2009/0285123 A1 * | 11/2009 | Huang et al. | ................. | 370/254 |

OTHER PUBLICATIONS

PCT/US2011/061067, International Search Report and Written Opinion of the International Searching Authority mailed Jul. 31, 2012.

* cited by examiner

*Primary Examiner* — Tauqir Hussain
(74) *Attorney, Agent, or Firm* — Baker & McKenzie LLP

(57) ABSTRACT

Systems and methods for fast, efficient content-based routing that allow a router to perform true content-based routing without having to de-serialize the data and apply a full content-based filter by determining the exact set of consumers to forward the data onto based on packet headers. A system for fast content-based routing may receive a subscription from a receiver machine and may assign a unique ID associated with the subscription in a router table. The system may then place a ID associated with a particular subscription in a message header if the message corresponds to the subscription. The system may then analyze the router table to determine one or more receiver machines associated with the ID in the header of the message. The system may then send, from a sender machine to one or more receiver machines, one or more messages containing the ID in the header of the message.

25 Claims, 10 Drawing Sheets

137

| SUBSCRIPTION | UNIQUE ID FOR SUBSCRIPTION |
|---|---|
| {MAGAZINE = SPORTS} | 15 |
| {FINANCE = STOCKS} | 16 |

| SUBSCRIPTION | PRODUCER (P) | UNIQUE ID FOR P | CONSUMER (C) | UNIQUE ID FOR C |
|---|---|---|---|---|
| {MAGAZINE = SPORTS} | P | 22 | C1 | 15 |
| {FINANCE = STOCKS} | P | 23 | C2 | 16 |

*FIG. 1C*

```
bool findmatch (treenode, message)
{
    if (treenode == NULL)
        return true while message not empty
        Try to find a field node within treenode whose name/value match
        the first name/value in message if (matching field node was found)
            if (findmatch (fieldnode->child,
                           message - fieldname/value) )
                return true message = message - fieldname/value return false
}
```

FIG. 11 { 1100

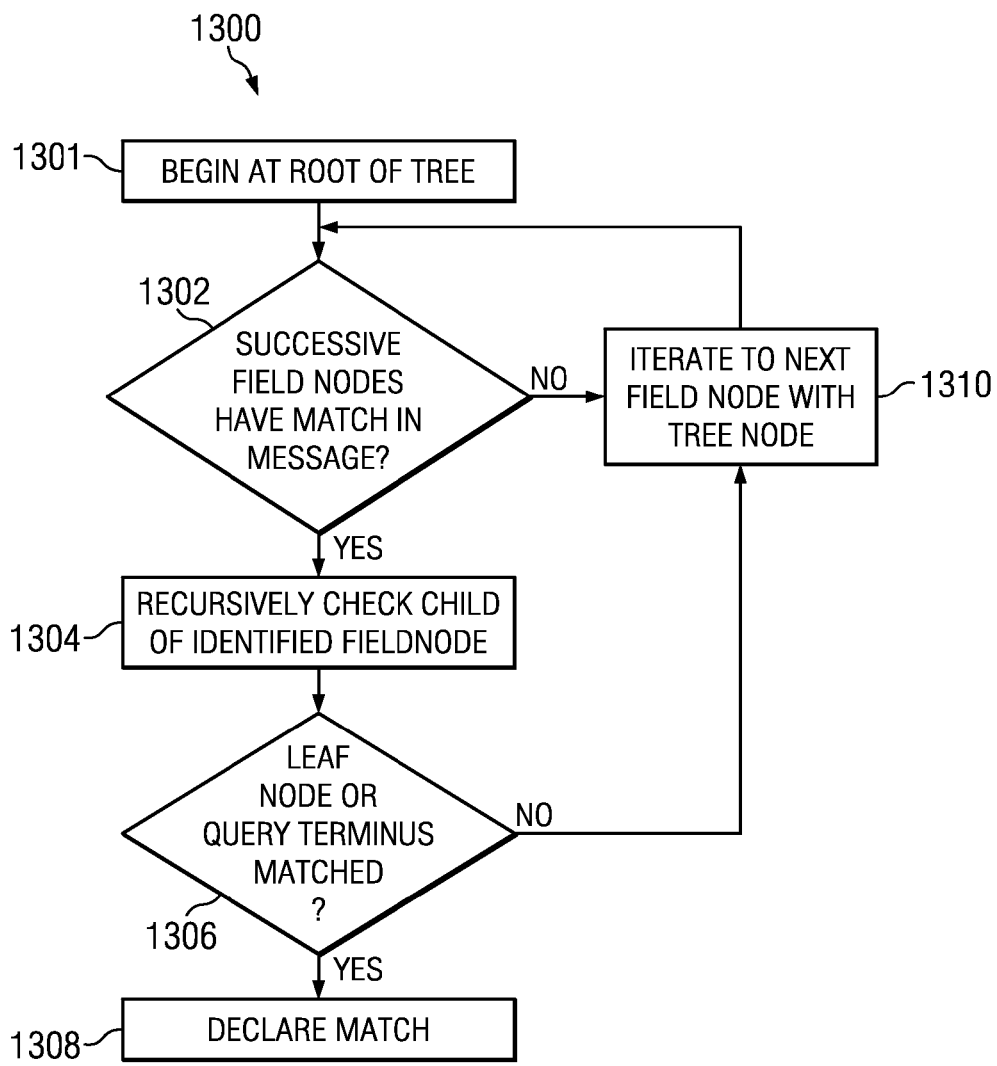

FAST CONTENT-BASED ROUTING

CROSS REFERENCE TO RELATED APPLICATIONS

This application relates and claims priority to U.S. Provisional Patent Application No. 61/538,645 entitled "Fast content-based routing," filed on Sep. 23, 2011, and U.S. Provisional Patent Application No. 61/414,327 entitled "Fast matching for content-based addressing," filed on Nov. 16, 2010, both of which are hereby incorporated by reference in their entirety.

TECHNICAL FIELD

The disclosed embodiments relate generally to content-based routing and, more specifically, relate to processes and systems for efficient content-based routing avoiding repetitive content-based matching by extracting information from a header field of a message in the context of a message-oriented middleware system.

BACKGROUND

Known content-based routing messages are based on the actual content of the message itself, rather than by a destination specified by the message. Content-based routing works by opening a message and applying a set of routing rules to the message's content to determine its destination. Because the sending machine does not need to know the message's destination, content-based provides a high degree of flexibility and adaptability to change. However, it may be computationally expensive to search the entire content of every message each time a message is to be routed. The need has arisen to provide a system and method to perform fast, efficient content-based routing. Accordingly, systems and methods are desired that allow a router to perform true content-based routing without having to de-serialize the data and apply a full content-based filter by determining the exact set of consumers to forward the data onto based on packet headers.

SUMMARY

Disclosed are systems and methods for fast content-based routing. Systems and methods for fast content-based routing may receive a subscription from a receiver machine and may assign a unique subscription ID associated with the subscription in a router table. The systems and methods may then place a subscription ID associated with a particular subscription in a message header if the message corresponds to the subscription. The systems and methods may then analyze the router table to determine one or more receiver machines associated with the subscription ID in the header of the message. The systems and methods may then send, from a sender machine to one or more receiver machines, one or more messages containing the subscription ID in the header of the message.

The present disclosure provides several important technical advantages. The disclosed systems and methods allow a router to perform true content-based routing without having to de-serialize the data and apply a full content-based filter by determining the exact set of consumers to forward the data onto based on message headers. Fast content-based routing may be more efficient than fast matching for content-based addressing because a system for fast content-based routing does not require a matching tree to be built. A system for fast content-based routing may place one or more subscription IDs in a message header, the subscription IDs corresponding to a subscription from a consumer. The system may then route those messages containing a subscription ID corresponding to a subscription request from a sender machine to one or more receiver machines.

BRIEF DESCRIPTION OF THE DRAWINGS

FIG. 1B is a diagram of an example assignment table, in accordance with the present disclosure;

FIG. 1C is a diagram of an example router table, in accordance with the present disclosure;

FIG. 11 is a schematic diagram illustrating an exemplary routine for matching a message to a matching tree, in accordance with the present disclosure;

FIG. 12 is a schematic diagram illustrating an exemplary routine for determining an internally marked terminal in the process of matching against a matching tree, in accordance with the present disclosure;

FIG. 13 is a flow diagram illustrating an example process for matching a matching tree to a message.

DETAILED DESCRIPTION

Figure 1A:
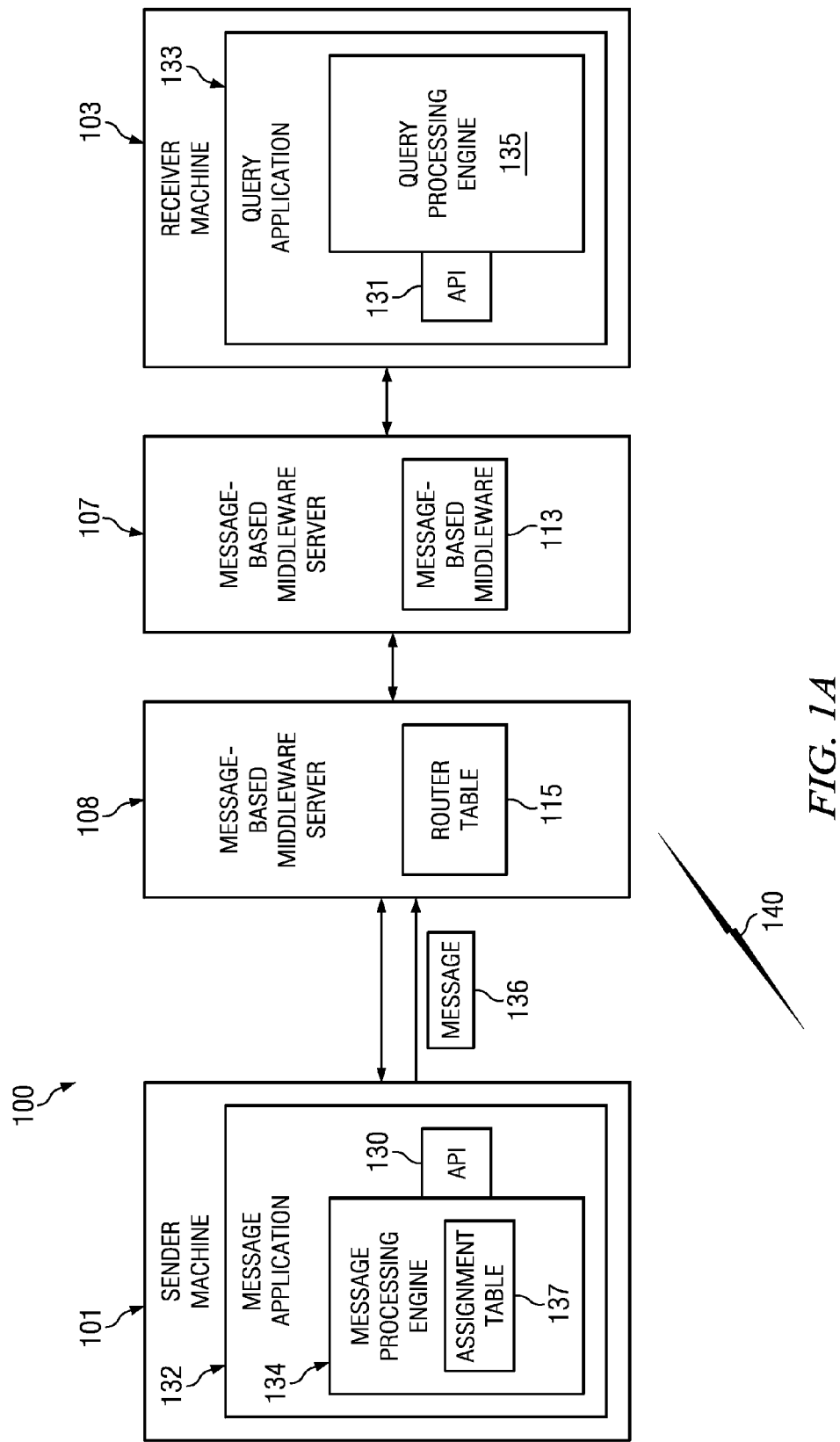
FIG. 1A is a schematic diagram of an example system for efficient matching for content-based addressing, in accordance with the present disclosure.

FIG. 1A is a schematic diagram of a first embodiment of an example system 100 for efficient matching for content-based addressing. FIG. 1E is a schematic diagram of a second embodiment of an example system 100 for efficient matching for content-based addressing.

Referring now to FIG. 1A, system 100 may include a sender machine 101, a receiver machine 103, and message-based middleware servers 107, 108. For purposes of example and explanation, the present disclosure describes the type of ordering as canonical, but any appropriate type of ordering may be used to achieve the results of the present disclosure. The queries may be sorted in numerical order, reverse numerical order, alphabetical order, reverse alphabetical order, or any other ordering system that may allow for fields to be searched in the same order.

Sender machine 101 may include a message application 132 for generating a message with content-based addressing to be sent to message-based middleware servers 107, 108. Message-based middleware servers 107, 108 may evaluate the content-based addressing to determine whether to send the message to receiver machine 103. Message application 132 may include a message processing engine 134 for processing content-based addressing data, content, fields, and formatting information for a message to be sent to receiver machine 103. Message application 132 may also include an application programming interface ("API") 130 as an interface for message-based middleware servers 107, 108. While illustrated as a single sender machine 101 in FIG. 1, system 100 may comprise more than one sender machine 101 in communication with message-based middleware servers 107, 108. Although described as sender machine 101 in FIG. 1, sender machine 101 may receive and process queries in some embodiments. Sender machine 101 may also include an assignment table 137, which will be described in more detail in FIG. 1B.

Receiver machine 103 may include a query application 133 for generating a query to be sent to message-based middleware servers 107, 108 for matching against the content-based addressing messages sent by sender machine 101. A query may be a request originating from the receiver machine 103 such as, by way of example, a request to return all content-based addressing messages that include a field node A with a value of 1 and a field node of B with a value of 4. Query application 133 may further include a query processing engine 135 for processing query information, data, fields, and formatting information for a given query or set of queries. Query application 133 may also include an application programming interface ("API") 131 as an interface to message-based middleware servers 107, 108. While illustrated as a single receiver machine 103 in FIG. 1, system 100 may comprise more than one receiver machine 103 in communication with message-based middleware server 107, 108. Although described as receiver machine 103 in FIG. 1, receiver machine 103 may generate and send messages in some embodiments.

The sender machine 101 and the receiver machine 103 may be in communication with message-based middleware servers 107, 108. Although FIG. 1A depicts each of message-based middleware servers 107, 108 as a single server, there may be multiple middleware servers 107, 108. A first message-based middleware servers 108 may include router table 115, while a second message-based middleware server 107 may include message-based middleware 113, which will be described in more detail in FIG. 1C.

Referring now to FIG. 1E, in a second embodiment, sender machine 101 and receiver machine 103 may communicate directly with each other through peer-to-peer (P2P) communications over network 140. In the P2P configuration, sender machine 101 may comprise a router and router table 115 located within sender machine 101. Receiver machine 103 may also comprise a router located within the receiver machine 103. While only one sender machine 101 and one receiver machine 103 are shown in FIG. 1E, system 100 may comprise any number of sender machines 101 and any number of receiver machines 103 in direct communication with each other over the P2P network 140. Many sender machines 101 may be in contact with many receiver machines 103 over the P2P network 140.

In both FIG. 1A and FIG. 1E, network 140 may represent any form of communication network supporting circuit-switched, packet-based, and/or any other suitable type of communications between sender machine 101, receiver machine 103, and message-based middleware servers 107, 108, and any other elements in FIGS. 1A and 1E. Network 140 may additionally include any other nodes of system 100 capable of transmitting and/or receiving information over a communication network. Although shown in FIGS. 1A and 1E as a single element, network 140 may represent one or more separate networks (including all or parts of various different networks) that are separated and serve different respective elements illustrated in FIGS. 1A and 1E. Network 140 may include routers, hubs, switches, firewalls, content switches, gateways, call controllers, and/or any other suitable components in any suitable form or arrangement. Network 140 may include, in whole or in part, one or more secured and/or encrypted Virtual Private Networks (VPNs) operable to couple one or more network elements together by operating or communicating over elements of a public or external communication network. In general, network 140 may comprise any combination of public or private communication equipment such as elements of the public switched telephone network (PSTN), a global computer network such as the Internet, a local area network (LAN), a wide area network (WAN), or other appropriate communication equipment. In some embodiments, network 140 may not be used if all of the components are located on the same machine.

System 100 may comprise sender machine 101, receiver machine 103, and in some embodiments, message-based middleware servers 107, 108, each of which may be any suitable computing device comprising a processor and a memory to perform the described functionality. Sender machine 101, receiver machine 103, and message-based middleware servers 107, 108 may comprise one or more machines, workstations, laptops, blade servers, server farms, and/or stand-alone servers. Sender machine 101, receiver machine 103, and message-based middleware servers 107, 108 may include any hardware and/or controlling logic used to communicate information to and from one or more elements illustrated in FIGS. 1A and 1E. For example, sender machine 101, receiver machine 103, and message-based middleware servers 107, 108 may be operable to receive and process data of different types that may be transmitted via different protocols or formats. Other elements in FIGS. 1A and 1E may also comprise hardware and/or controlling logic to communicate information to and from one or more elements illustrated in FIGS. 1A and 1E.

Memory may store any suitable information. Memory may comprise any collection and arrangement of volatile and/or non-volatile components suitable for storing data. For example, memory may comprise random access memory (RAM) devices, read only memory (ROM) devices, magnetic storage devices, optical storage devices, and/or any other suitable data storage devices. In particular embodiments, memory may represent, in part, computer-readable storage media on which computer instructions and/or logic are encoded. Memory may represent any number of memory components within, local to, and/or accessible by processor. Processor may represent and/or include any form of processing component, including general purpose computers, dedicated microprocessors, or other processing devices capable of processing electronic information. Examples of processor include digital signal processors (DSPs), application-specific integrated circuits (ASICs), field-programmable gate arrays (FPGAs), and any other suitable specific or general purpose processors.

Fast Content-based Routing

Content based routing routes messages based on the actual content of the message itself, rather than by a destination specified by the message. Content-based routing works by opening a message and applying a set of routing rules to the content of the message to determine its destination. Because the sending machine does not need to know the message's destination, content-based provides a high degree of flexibility and adaptability to change. Advantageously, fast content-based routing may be more efficient than fast matching for content-based addressing because a system for fast content-based routing does not require a matching tree to be built.

A system for fast content-based routing may place one or more subscription IDs in a message header, the subscription IDs associated with a particular subscription from a consumer. The system may then route those messages containing a subscription ID corresponding to a subscription request from a sender machine to one or more receiver machines. In an embodiment, the subscription ID may be an integer, although the subscription ID may also be numeric, alphabetic, or alphanumeric.

System 100 may be configured to forward messages 136 from message producers associated with one or more sender machines 101 to message consumers associated with one or more receiver machines 103. A consumer may have specific kinds of data that they are interested in receiving and may communicate that interest from receiver machine 103 to sender machine 101. The specific data may be a subset of the totality of data published by all producers at every sender machine 101 associated with the system 100. Consumers may be able to express interest in specific content by using a filter, which, when applied to one or more messages 136 originating at sender machines 101, may select only those messages 136 that contain such content to send to the consumers associated with receiver machines 103. Although the illustrated embodiment in FIG. 1 includes only one consumer associated with one receiver machine 103 and one producer associated with one sender machine 101, system 100 may have many producers and consumers. Each consumer may subscribe to many filters and/or subscriptions.

In order to avoid requiring that all consumers to be directly associated with all producers, one or more intermediaries (e.g., middleware servers 107, 108) may be utilized as one or more routers. The producers and the consumers may associate through the routers in middleware servers 107, 108 in an embodiment, or directly between sender machine 101 and receiver machine 103 through one or more internal routers in a separate embodiment. The routers may ensure that content data is forwarded only to interested consumers. To perform their work efficiently, routers are frequently organized in a network such as network 140. Content messages 136 may be forwarded throughout the network by the routers, ensuring that as data is forwarded, it may be forwarded to only interested consumers. If there is no matching interest downstream, the routers may not forward the data.

System 100 may allow for faster, more efficient content-based routing by allowing routing decisions to be made without having to examine the content of message 136, while still only forwarding those messages 136 towards consumers who may be interested in the content of messages 136. System 100 may allow a router to perform true content-based routing without having to de-serialize the data and may apply a full content-based filter by determining the exact set of consumers to forward the data onto based on packet headers.

For example, each message 136 may be assigned a unique subscription ID that is associated with a subscription matching the message's content, and the subscription ID may be stored in the header field of message 136. System 100 may then quickly and efficiently extract the subscription ID in the header field to determine the content of the message, rather than performing a more complicated and inefficient search of the entire body of the message to determine its content. Thus, system 100 may be able to perform fast content-based matching of messages in order to more efficiently filter and route the messages to only those consumers associated with a particular receiver machine ID interested in the content of the message. Through a routing protocol, integer headers may be added to each message 136 corresponding to consumer subscriptions, and sender machines 101 may only forward those messages to receiver machines 103 whose content consumers are interested in receiving.

At a high level, a consumer associated with a receiver machine 103 may only be interested in a subset of messages from a data stream comprising all messages 136 from all sender machines 101 and may communicate that interest directly to a sender machine 101. Logic, located either at sender machine 101 and, in a non-P2P configuration, at message-based middleware servers 107, 108, may be used to assign a subscription ID in router table 115 to correspond to the particular subset of information that the consumer is interested in receiving. Once the subscription ID corresponding to the particular subset of information has been assigned, sender machine 101 may place the subscription ID in the message header for all messages originating at the one or more sender machines 101 comprising that information. Sender machine 101 may then analyze router table 115 to determine one or more receiver machines 103 associated with the subscription ID in the header of message 136. Sender machine 101 may then send one or more messages to one or more receiver machines 103 associated with the subscription ID in the header of message 136. Advantageously, if no consumers are interested in the content of a message 136, that message 136 may not be sent to any receiver machine 103, freeing valuable bandwidth on system 140.

System 100 may conduct fast content-based routing by distributing the interests, subscriptions, or filters from each consumer to the producers through network 140. In the examples that follow and as described in more detail in association with FIGS. 1B, 1C, 1D, and 14, two consumers (C1, C2) may be associated with receiver machines 103 and one producer (P) may be associated with sender machine 101. Sender machine 101 and receiver machine 103 may be in communication with each other through a router (R) associated with middleware servers 107, 108 or associated with sender machine 101 in a P2P network configuration.

Figure 14:
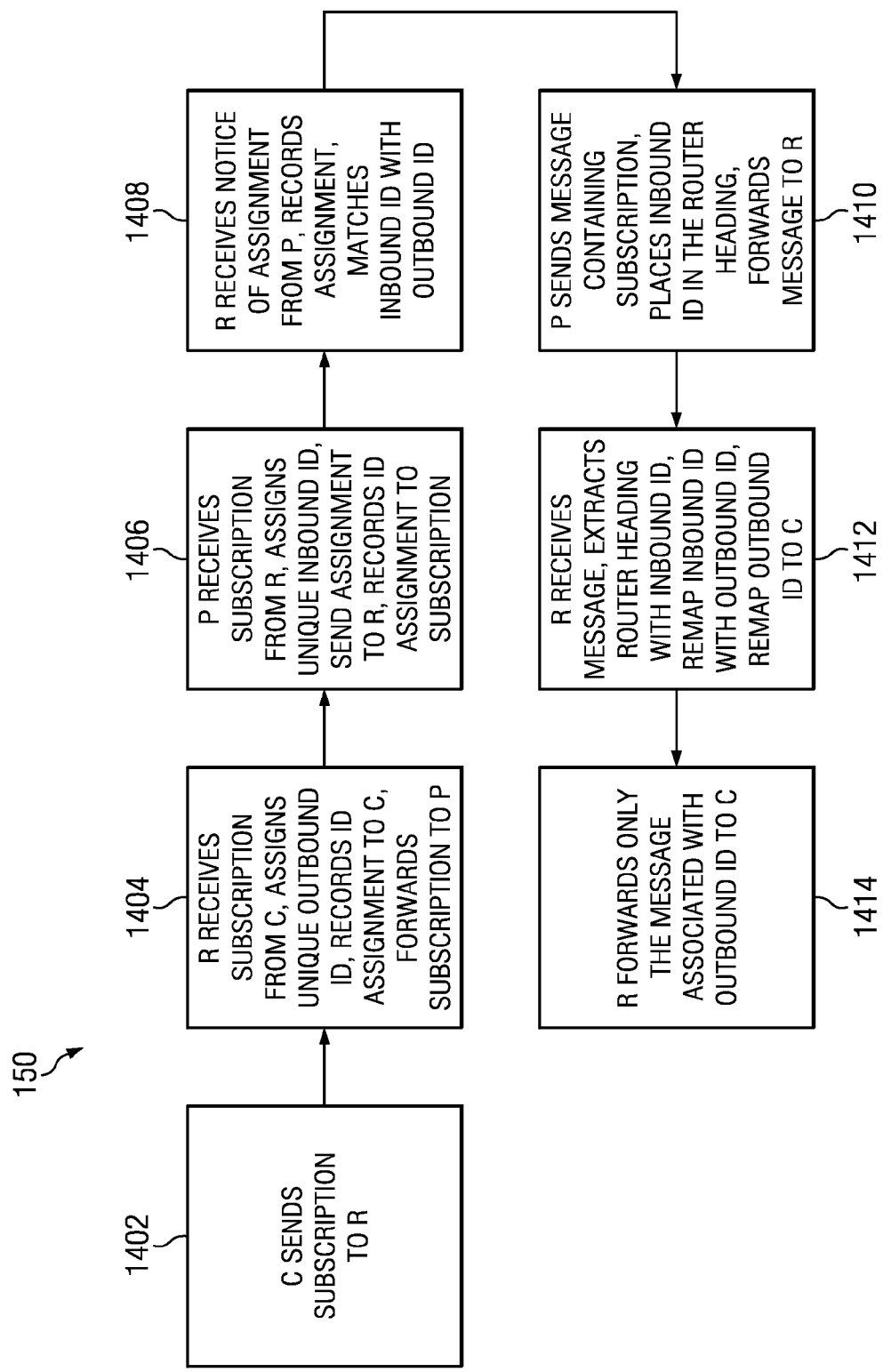
FIG. 14 is a high-level flow diagram illustrating an example process for fast content-based routing, in accordance with the present disclosure.

FIG. 14 is a high-level flow diagram illustrating an example process 1400 for fast, efficient content-based routing. FIG. 1B is a diagram of an example assignment table 137. FIG. 1C is a diagram of an example router table 115.

Figure 1D:
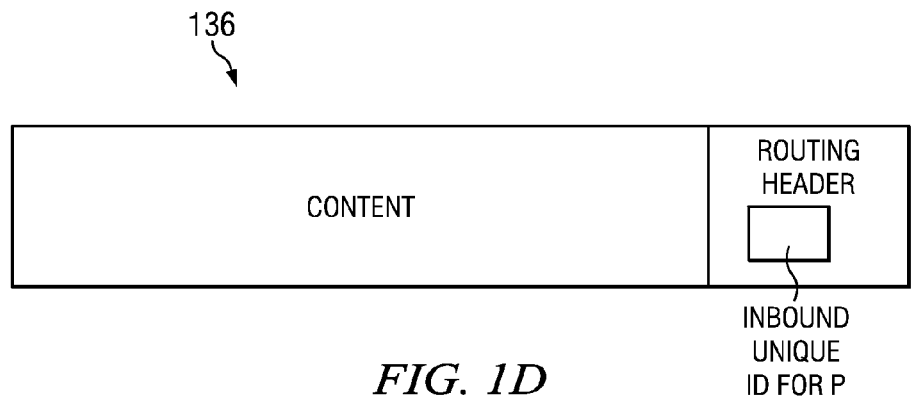
FIG. 1D is a diagram of an example message having a routing header, in accordance with the present disclosure.
Figure 1E:
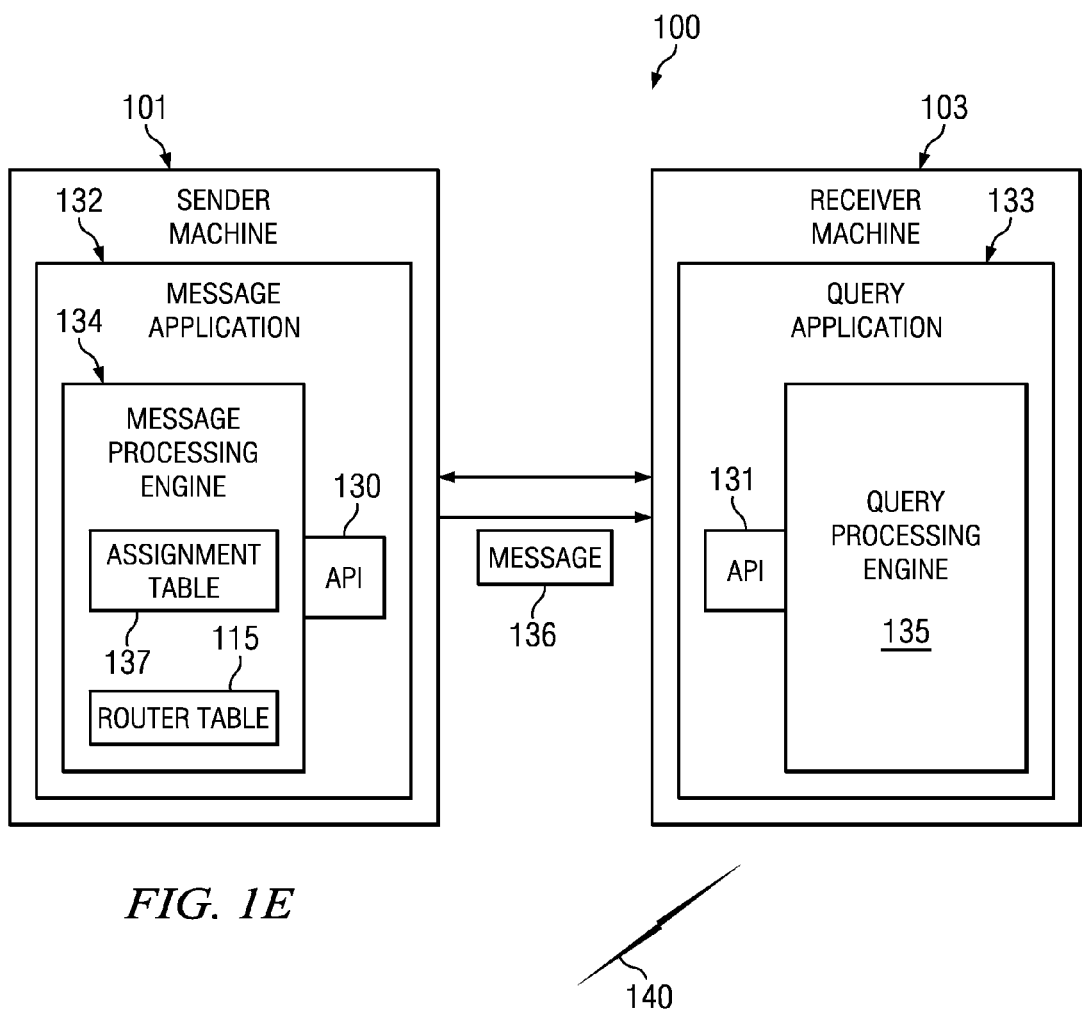
FIG. 1E is a schematic diagram of an example system for efficient matching for content-based addressing, in accordance with the present disclosure.

FIG. 1D is a diagram of an example message 136 having a routing header. In a first example, a consumer may only be interested in a weekly sports magazine and not news or home and garden magazines. In a second example, a consumer may only want to receive messages related to a particular project and not other messages unrelated to that particular project.

In a first example, consumer C1 may be interested in data which contains the field "magazine" with value "sports." One or more fields may be associated with a category of content, while one or more values may be associated with a particular type of content. At action 1402, consumer C1 may send a subscription for '{magazine=sports} ' to router R. At action 1404, router R may receive the subscription for '{magazine=sports} ' from consumer C1 and may assign it a unique outbound ID, such as the unique outbound ID of 15, as shown in the assignment table 137 of FIG. 1B. The router R may then associate unique ID 15 with consumer C1, as shown in router table 115 of FIG. 1C, and may forward the subscription '{magazine=sports} ' to producer P.

At action 1406, producer P may receive the subscription '{magazine=sports} ' from router R and may assign the subscription the unique inbound ID of 22. Producer P may then send the assignment to router R and may associate the subscription '{magazine=sports} ' with the unique inbound ID of 22 in router table 115 of FIG. 1C. At action 1408, router R may receive a message from producer P that producer P assigned unique ID 22 to subscription '{magazine=sports} ' and may record the assignment for P in router table 115 of FIG. 1C. Router R may then match outbound ID of 15 with the inbound ID of 22 for all future messages 136 sent by a producer P.

At action 1410, producer P may send a message 136 that contains sports content. For example, message 136 may include a field "magazine" with a value "sports" that consumer C1 may want to receive. Producer P may place the unique inbound ID of 22 associated with subscription '{magazine=sports} ' in the routing header of message 136, as shown in FIG. 1D, and forward message 136 on to router R. At action 1412, router R may receive message 136 with the inbound ID of 22 in the routing heading of message 136, and use the inbound ID of 22 to determine which consumers to route message 136 to for certain unique outbound IDs, as listed in router table 115 of FIG. 1C.

System 100 may perform fast content-based matching of messages in order to more efficiently filter and route the messages to those consumers interested in the content of the message. Using the information from action 1404, router R may route message 136 with the outbound ID of 15 to consumer C1, as shown in router table 115 of FIG. 1C. At action 1414, router R may forward only the message 136 associated with the unique outbound ID of 15 to consumers that have subscribed to this content.

In a second example, consumer C2 may be interested in data which contains the field "finance" with the value "stocks." At action 1402, consumer C2 may send a subscription for '{finance=stocks} ' to router R. At action 1404, router R may receive the subscription for '{finance=stocks}' from consumer C2 and may assign it a unique outbound ID of 16, as shown in the assignment table 137 of FIG. 1B. The router R may then associate unique ID 16 with consumer C2, as shown in router table 115 of FIG. 1C, and may forward the subscription '{finance=stocks}' to producer P.

At action 1406, producer P may receive the subscription '{finance=stocks} ' from router R and may assign the subscription the unique inbound ID of 23. Producer P may then send that assignment to router R and may associate the subscription '{finance=stocks}' with the unique inbound ID of 23 in router table 115 of FIG. 1C. At action 1408, router R may receive a message from producer P that producer P assigned unique ID 23 to subscription '{finance=stocks}' and may record the assignment for P in router table 115 of FIG. 1C. Router R may then match outbound ID of 16 with the inbound ID of 23 for all future messages 136 sent by a producer P.

At action 1410, producer P may send a message that contains financial stock content for a particular project. For example, the message may include a field "finance" with a value "stock" that consumer C2 may want to receive. Producer P may place the unique inbound ID of 23 associated with subscription '{finance=stocks}' in the routing header of the message, as shown in FIG. 1D, and forward the message on to router R. At action 1412, router R may receive the message with the inbound ID of 23 in the routing heading, and use the inbound ID of 23 to determine which consumers to route the message to for certain unique outbound IDs, as listed in router table 115 of FIG. 1C.

System 100 may perform fast content-based matching of messages in order to more efficiently filter and route the messages to those consumers interested in the content of the message. Using the information from action 1404, router R may route the message with the outbound ID of 16 to consumer C2, as shown in router table 115 of FIG. 1C. At action 1414, router R may forward only the message associated with the unique outbound ID of 16 to consumers that have subscribed to this content.

Fast Matching for Content-based Addressing

Content-based addressing typically allows receivers in a message-oriented middleware system to specify their interests as a query against the content of a message. For example, a message may include a field named "Ticker," a field type of string, and a field value of "TIBX," and a receiver might specify interest in any messages in which "Ticker=TIBX." The sender may send the message described above, and the middleware resolves which receivers have specified queries that match the content. Thus, the receiver specifying interest in messages in which "Ticker=TIBX" should receive the message described above.

Generalized content-based matching, in which numerous field types (e.g., integer, float, string, Boolean enumerations, etc.) are represented, and in which queries can use wildcards (e.g., an asterisk to match substrings) or regular expressions, are useful but expensive to compute. By limiting the data types and query syntax, more highly efficient content-based matching may be performed.

Figure 2:
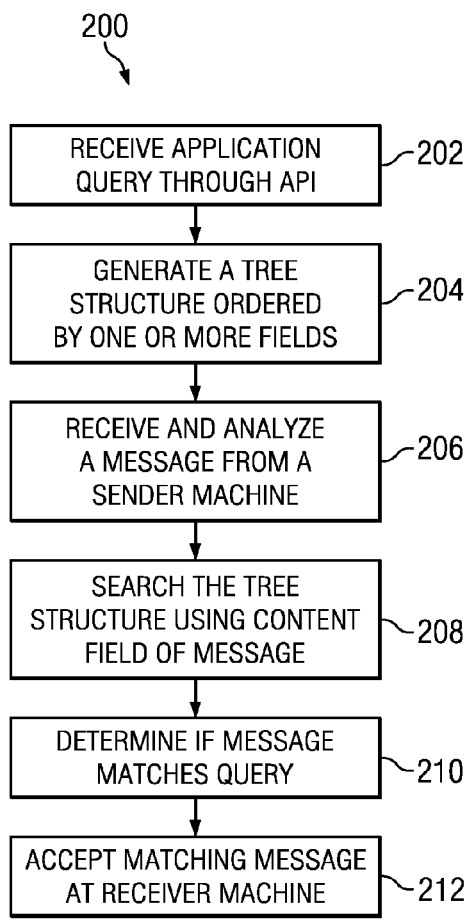
FIG. 2 is a high-level flow diagram illustrating an example process for efficient matching for content-based addressing, in accordance with the present disclosure.

FIG. 2 is a high-level flow diagram illustrating an example process 200 for fast, efficient matching for content-based addressing. The actions in FIG. 2 may each take place at receiver machine 103, and more specifically, may each take place at query application 133 or query processing engine 135 within receiver machine 103 or any other component of the system chosen to execute query processing engine 135 such as middleware server 107 or sender machine 101.

In operation, at action 202, query processing engine 135 may accept a query from query application 133 through API 131. The query may comprise one or more fields and one or more values, wherein the one or more fields are associated with an operand representing a category of content and the one or more values are associated with content.

In order to efficiently match content-based addressing, system 100 may impose restrictions on queries initiated at receiver machine 103 to ensure that the queries are properly formatted. For example, the following restrictions are imposed on the data and queries: (1) data fields may only be integers or strings; (2) queries may only use strict equality (e.g., "Ticker=TIBX"); (3) queries may only use conjunction (e.g., "Ticker=TIBX and Value=32"); and (4) fields may only appear at most once within a data message. In this embodiment, disjunction may be implied by using multiple queries.

At action 204, system 100 may generate, at receiver machine 103, a tree structure ordered by one or more fields of the query, wherein the tree structure comprises one or more tree nodes and the one or more tree nodes comprise one or more query nodes. At action 206, receiver machine 103 may receive and analyze a message from sender machine 101. The message may comprise one or more content fields associated with one or more content values. At action 208, receiver machine 103 may search the tree structure using the one or more content fields of the message.

At action 210, receiver machine 103 may determine if the content value of the message matches a content value of the query stored in the tree structure. At action 212, receiver machine 103 may accept the message from sender machine 101 if the content value of the message matches one or more content values of the query stored in the tree structure.

Figure 3:
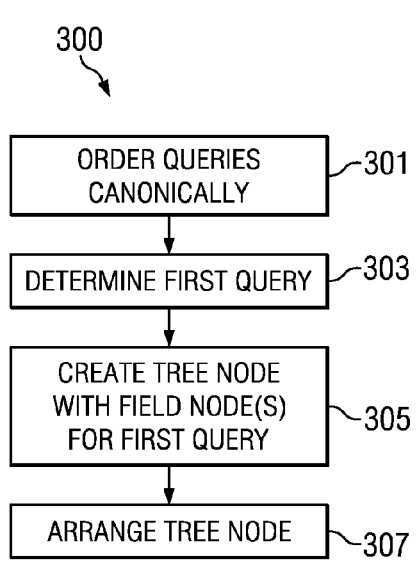
FIG. 3 is a flow diagram illustrating an example process for building a matching tree, in accordance with the present disclosure.

FIG. 3 is a flow diagram illustrating an example process 300 for building a matching tree based on a query from receiver machine 103. The query may be placed into any order (e.g., canonical order) at action 301 by sorting each query's operands in some consistent order based on field names. Thus, a query that is written as A=1 and C=3 and B=4 may be rewritten in the order of A=1 and B=4 and C=3 at action 301. Sorting each query into canonical order allows for fields to be searched in the same order, thereby improving the performance of the process's (e.g., the process 200 in FIG. 2) matching phase by allowing for one path in the tree for any particular match.

To build a tree, the queries may be processed one-at-a-time, creating tree nodes that contain one or more field nodes, each of which is associated with one or more values. The first query (e.g., A=1) is analyzed at action 303. For the first query, a linear 1-ary tree is built at action 305 in which each tree node may represent one operand in the query (and, thus, contains one field node), and the tree nodes are arranged at action 307 such that the first operand is the root, the last operand is the leaf, and the intermediate operands are arranged from first to last (root to leaf).

Figure 4:
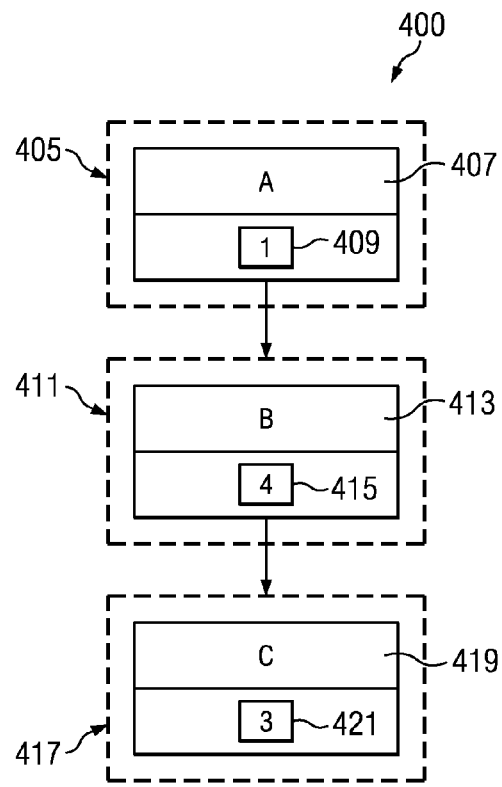
FIG. 4 is a schematic diagram illustrating an exemplary matching tree, in accordance with the present disclosure.

FIG. 4 is a schematic diagram illustrating an exemplary matching tree 400 for a canonically sorted query A=1 and B=4 and C=3. As discussed above, for the first query, each tree node contains a separate operand in the query and one field node. As shown in FIG. 4, a top-most tree node 405 illustrates an operand A=1. Tree node 405 comprises a field node 407 represented by 'A' with a value represented by 1. Tree node 411 comprises a field node 413 represented by 'B' with a value 415 represented by 4. Tree node 417 comprises a field node 419 represented by 'C' with a value 421 represented by 3.

In an embodiment, if a tree node contains queries A=1, A=2, and B=3, then logically separate field nodes for A and B may be present within that tree node. Query A's field node may contain two value entries, 1 and 2, and query B's field node may contain a single value entry, 3. Each field node query value entry (1, 2, and 3 in this example) has an edge pointing at a child tree node.

As depicted in FIG. 4, tree nodes, as represented by the dashed lines, may contain one or more field nodes once other queries are added to the tree. The field nodes, as represented by the solid line and containing an ordered operand (i.e., A, B, C, etc.), may also contain more than one value per field name. The field node combined with the value may together constitute a query node (i.e., A and 1 when the query is 'A=1'). To add another query to the tree, the new query's operands are iterated through and existing field nodes may be re-used (adding new value entries as needed) as long as possible. When a tree node does not contain a matching field node, a new field node may be added to continue to build a new sub-tree. Each query node contains logically separate entries for the field name and value, and tree edges may connect the value entry of a query node to leaf (child) tree node.

Figure 5:
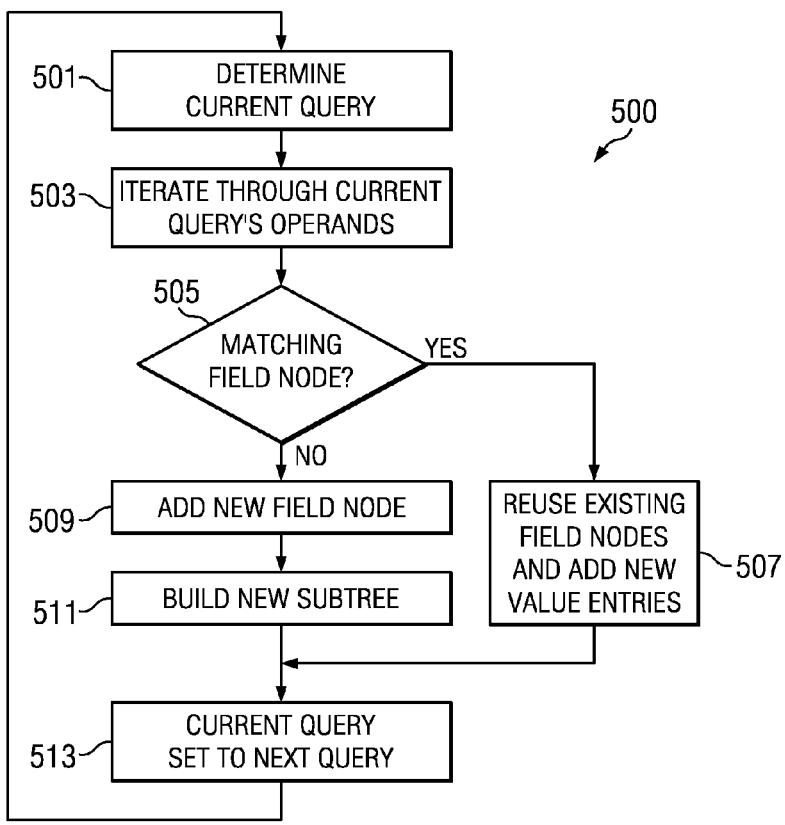
FIG. 5 is a flow diagram illustrating an example process for building a matching tree, in accordance with the present disclosure.

FIG. 5 is a flow diagram illustrating an example process 500 for building a matching tree at query processing engine 135. At action 501, the current query is determined starting with the first query in the set of queries. Thus, the first time process 500 is iterated, the current query is the first query. The process iterates through the current query's operands at action 503 to build tree nodes for the current query. At decision 505, query processing engine 135 determines whether a matching field node exists for the current query. If so, then the existing field node may be re-used at action 507. (Note: when the first query is the current query, decision 505 may not result in no, and, thus, a new field node may be added at 509.)

If a matching field node does not exist for the current query at decision 505, then a new field node is added at action 509 and a new sub-tree is built at action 511 based on the new field node. If a matching field node does exist for the current query at decision 505, the current query is set to the next query in the set of queries at action 513 and the process starts over at action 501.

As shown in the following figures, and by way of example only, a set of four queries: A=1 and B=4 and C=3; A=2 and C=3; A=1 and C=6; and B=7 and E=2 are processed and the resulting tree is built in four stages by query processing engine 135. The tree is built one query at a time (stage by stage), starting with the first query A=1 and B=4 and C=3, as interest is expressed by receiver machine 103.

Figure 6:
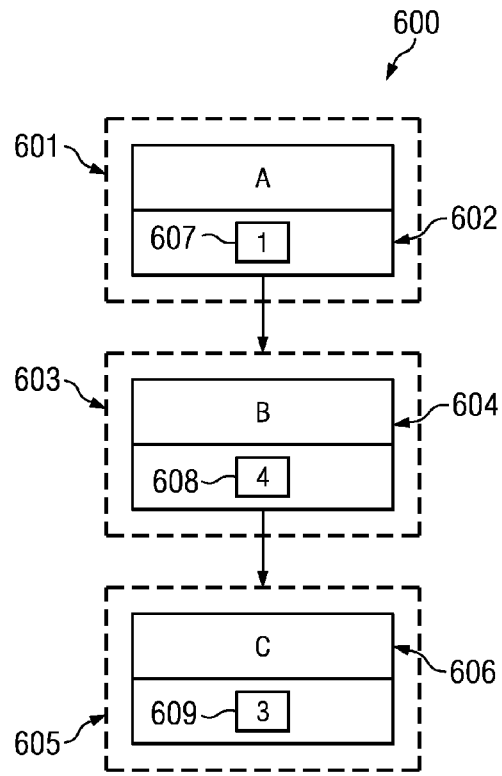
FIG. 6 is a schematic diagram illustrating building an exemplary matching tree, in accordance with the present disclosure.

FIG. 6 is a schematic diagram illustrating building a first stage of the exemplary matching tree 600. As discussed above in relation to FIGS. 3 and 4, for the first query, a linear 1-ary tree 600 is built in which each tree node 601, 603, 605 represents one operand in the query, and, thus, contains one field node 602, 604, 606, each with a value 607, 608, 609. Tree nodes are arranged such that the first operand (A=1) is the root tree node 601, the last operand (C=3) is the leaf tree node 605, and the intermediate operand (B=4) is the middle tree node 603. For the first query, each tree node 601, 603, 605 contains a separate operand in the query and one field node 602, 604, 606. Thus, the top-most tree node represents operand A=1, the middle tree node represents operand B=4, and bottom-most tree node represents operand C=3, each operand associated with a query node.

Figure 7:
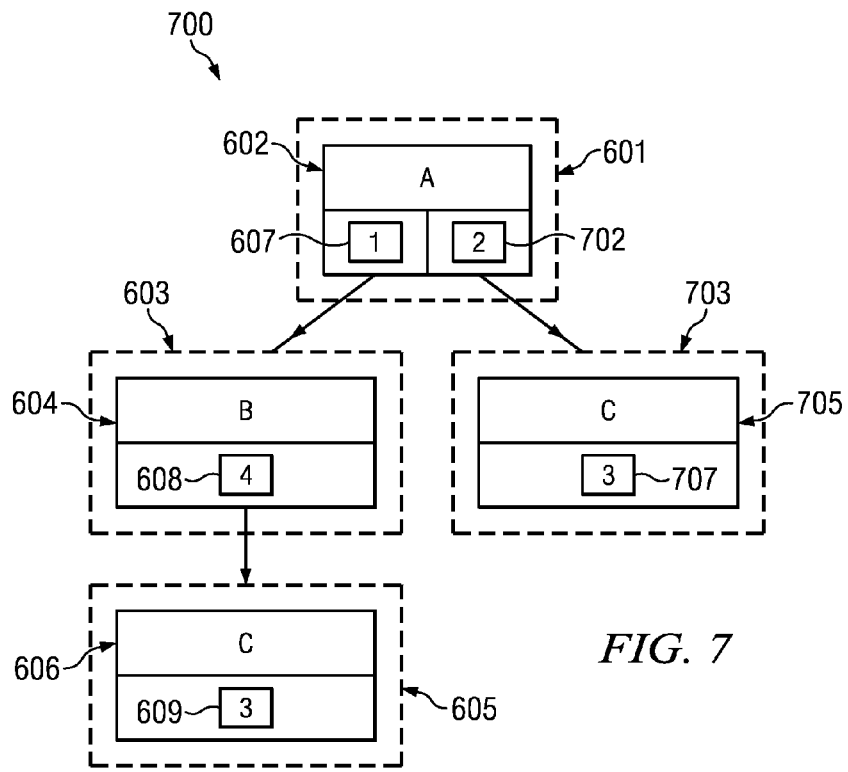
FIG. 7 is a schematic diagram illustrating building an exemplary matching tree by adding another query, in accordance with the present disclosure.

FIG. 7 is schematic diagram illustrating building a second stage of an exemplary matching tree 700 built from exemplary matching tree 600. Referring to both FIG. 5 and FIG. 7, at action 501, the current query is determined, which is the second query (A=2 and C=3). At action 503, the process iterates through the second query's operands. At action 505, it is determined that a matching field node exists for the first operand in the second query (A=2). So, the existing field node 602 (for A=1 from the first query,) may be re-used and a new value entry 702 (for A=2 from the second query) are added at action 507. The existing field node for A=1 (node 601) may be re-used for the second query, but the value field is split to include both value 607 for A=1 and value 702 for A=2. The new field value 702 becomes the root of a new branch in the tree. The next operand in the query (C=3) is inserted in the new branch, resulting in a new tree node 703 containing the operand C=3 for field node 705 and value 707. (In an embodiment, C does not re-use the C tree node 605 that is a child of the B tree node 603 from the first query because this is a tree not a directed acyclic graph ("DAG")).

Figure 8:
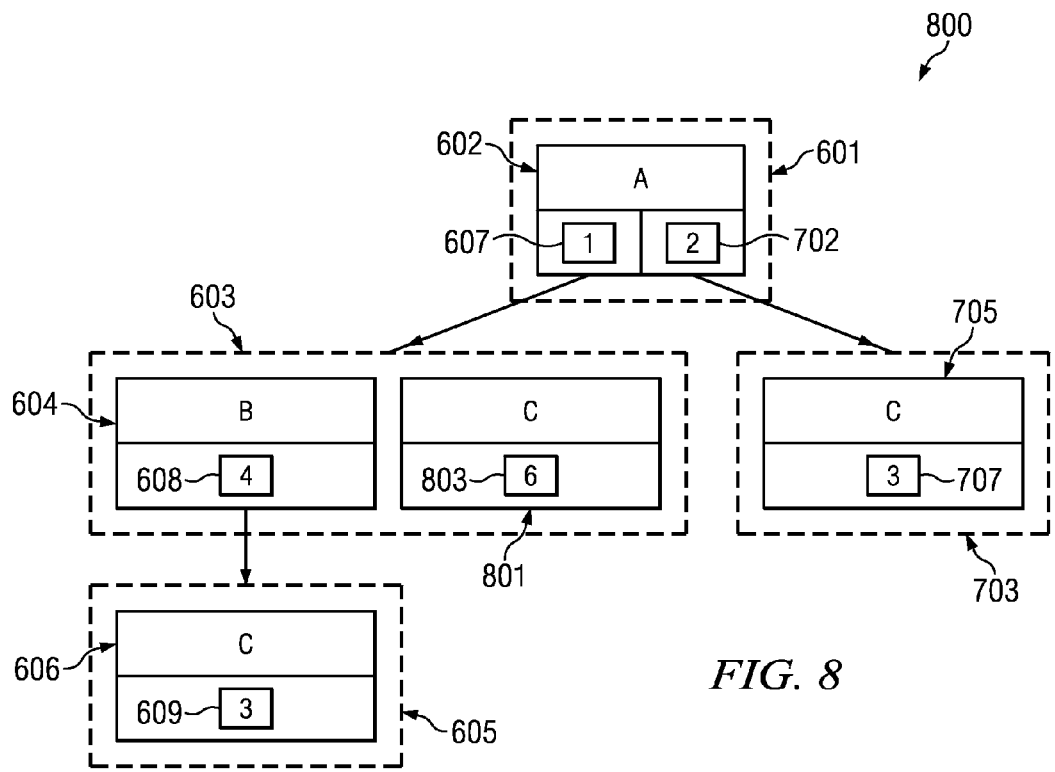
FIG. 8 is a schematic diagram illustrating building an exemplary matching tree by adding another query, in accordance with the present disclosure.

FIG. 8 is a schematic diagram illustrating building a third stage of an exemplary matching tree 800 built from exemplary matching trees 600, 700. Referring to both FIG. 5 and FIG. 8, at action 501, the current query is determined, which is the third query (A=1 and C=6). At action 503, the process iterates through the third query's operands. At action 505, it is determined that a matching field node exists for the first operand in the third query (A=1). So, the existing field node 602 (for A=1 from the first query) may be re-used for the third query. No new value entries are added because the first operand of the third query both have a value of A=1. The process moves to the next tree node 603 in the first query branch. At this tree node 603, a new field node 801 is added to represent the second operand in the third query (C=6) as field node 604 (B=4) does not match new field node 801 (C=6). The tree node 603 to which A=1 points may be re-used for the third query, but the existing B field node 604 is not re-used and, thus, a new C field node 801 with value 803 is created within tree node 603.

Figure 9:
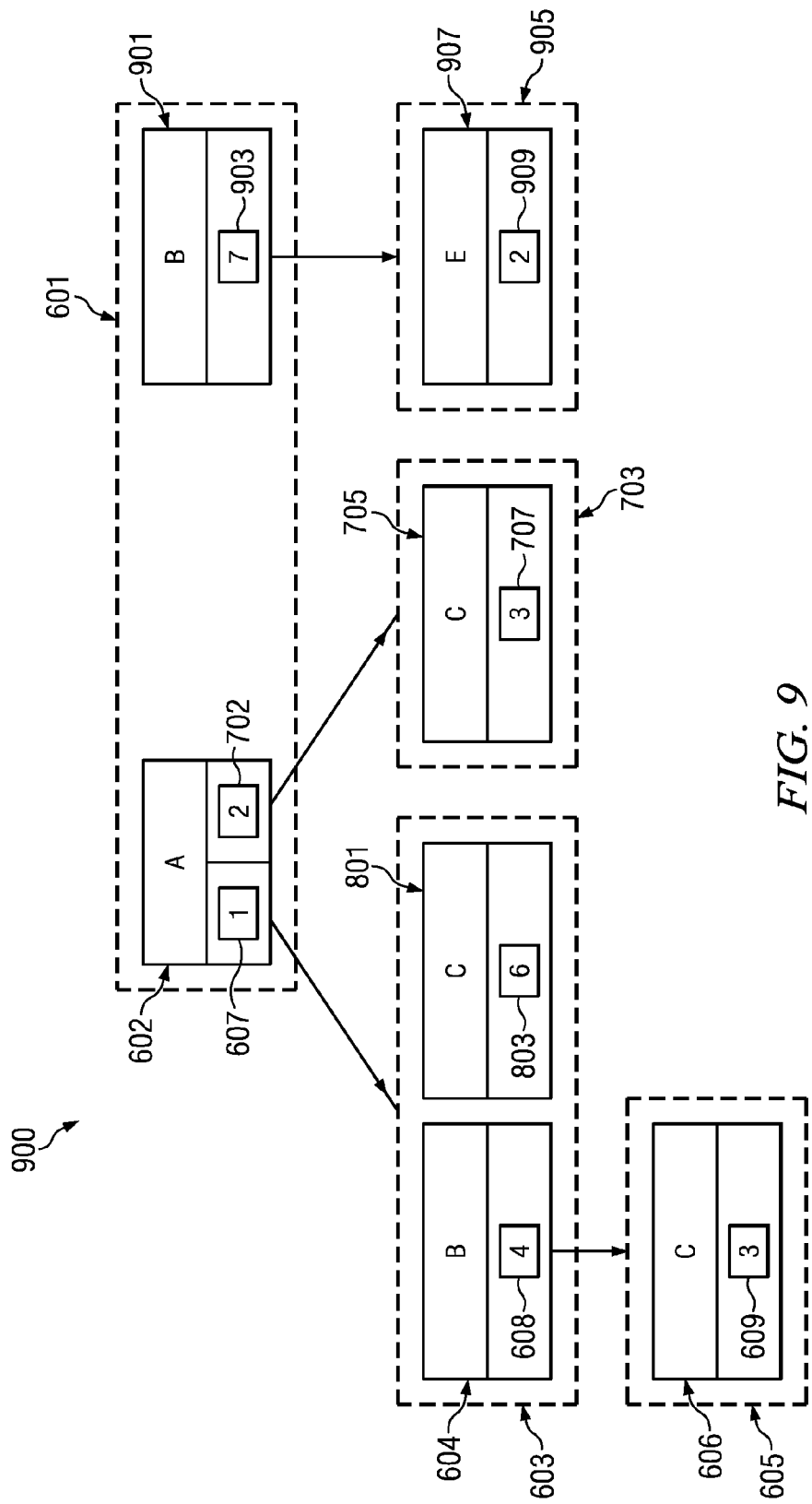
FIG. 9 is a schematic diagram illustrating an exemplary matching tree by adding another query, in accordance with the present disclosure.

FIG. 9 is a schematic diagram illustrating adding a fourth stage in an exemplary matching tree 900 built from exemplary matching trees 600, 700, 800. Referring to both FIG. 5 and FIG. 9, at action 501, the current query is determined, which is the fourth query (B=7 and E=2). At action 503, the process iterates through the fourth query's operands. At action 505, it is determined that no matching field node exists for the first operand in the fourth query (B=7). So a new field node 901 with value 903 is added at action 509 and a new sub-tree is built at action 511 based on the new field node 901. Thus, the root tree node 601 may be re-used, but because none of the field nodes within root tree node 601 are B field nodes, a new field node 901 is created at the root tree node 601 and a new tree branch is started. The next operand (E=2) is added in a first new tree node 905 in the new tree branch with field node 907 and value 909. Insertions may continue this way until all queries have been built into a tree.

Optimizing a Matching Tree Data Structure

In some embodiments, nodes of a matching tree may be augmented with additional data to improve the performance of the matching phase. The augmenting may take place at the time the matching tree is created. A tree node may include a list of fields in field nodes, a hash list of the tree node's leaf (child) nodes, where each child node may be represented as a combination of its field name and field value, and a list of queries that terminate at this tree node. Having this information stored at each tree node allows a matching process to quickly determine whether incoming data matches a query encoded in the tree, and allows the matching to optimize whether the matching tree is matched to the incoming data or the incoming data is matched to the matching tree. Referring back to FIG. 1, the optimal strategy depends on the size and/or height of the tree and the length of the incoming data, and can be chosen on-the-fly as data is presented for matching by the query processing engine 134 with query application 132 on a node-by-node basis. Having a list of queries that terminate at the tree node allows the tree to represent a query that may be prefix of another query. For example, in the tree of FIG. 9, the query A=1 and B=4 and C=3 may be represented in the tree by virtue of the tree root 915 being marked as a query leaf in addition to its role in the longer query.

Matching Against the Tree

In some embodiments, after query processing engine 135 has built the matching tree based on receiver machine's 103 query, query processing engine 135 may match an incoming data message to a query if any subset of the fields and values in the message match all of the fields and values in the query. Thus, the message "A=1 and B=4 and F=9" is a match for query "A=1 and B=4," but message "A=1 and B=4" is not a match for query "A=1 and B=4 and G=12" because the 'G=12' query node of the query is unmatched in the message.

To match an incoming data message, query processing engine 135 may sort the fields of the message in canonical order and the process either iterates through the fields of the message and walks the matching tree from its root, or walks the matching tree from its root and tracks whether an ongoing match within the message is found. Like the queries discussed earlier, the messages may be sorted in numerical order, reverse numerical order, alphabetical order, reverse alphabetical order, or any other ordering system that may allow for fields to be searched in the same order as the matching tree comprising the similarly sorted queries. The details of these methods are discussed below.

Figure 10:
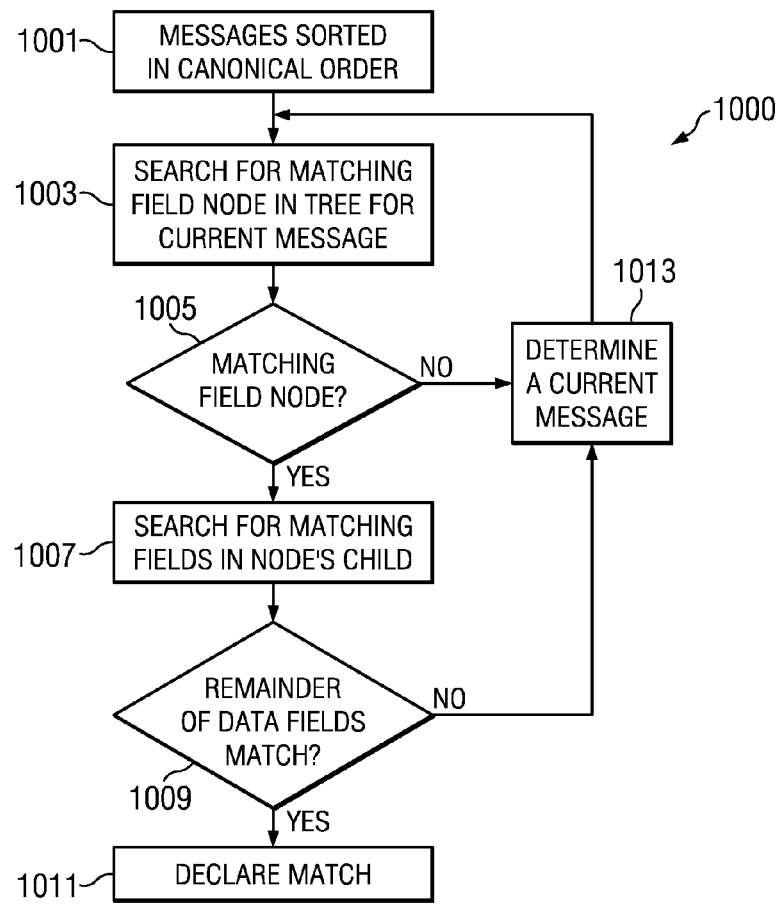
FIG. 10 is a flow diagram illustrating an example process for matching a message to a matching tree, in accordance with the present disclosure.

FIG. 10 is a flow diagram illustrating an example process 1000 for matching a message to a matching tree. At action 1001, the fields of the message are sorted in canonical order. Process 1000 includes iterating through the fields in the message, walking the tree from its root node, and, because partial matches of the message are considered a match, process 1000 is slightly more complicated than a single pass through the message.

Process 1000 recursively walks the tree, attempting at each tree node to find a matching field node. Thus, at action 1003, the process may search for a matching field node in the matching tree for the current message field (for the first iteration, the current message field is the first message field). If a matching field node is found at decision 1005, the search may continue recursively with the node's child at action 1007. At action 1007, the process attempts to match the remainder of the message's data fields. If the remainder of the message's data fields is not matched at decision 1009, then a new current message field may be determined at action 1013 and the process may start over at action 1003. If the remainder of the message's data fields are matched at decision 1009, then a match may be declared at action 1011.

If a matching node is not found at decision 1005, then the current message field is not a match and the process 1000 may repeat with a new message field by determining a new current message field at action 1013 and starting the process over at action 1003. If a matching field node is not found the search may continue by eliminating the current message field and continuing with the tail of the message because a query may match a subset of fields in a message (it is not necessary to match all fields).

FIG. 11 is a schematic diagram illustrating exemplary pseudo code 1100 for matching a message to a matching tree. For purposes of FIG. 11, the passing of arguments is by value and the recursive call to findmatch( ) does not alter the value of message at the calling level, but other variations may be used. Matching may be invoked by using findmatch(rootnode, message) and a result of true indicates that the message matched at least one of the queries encoded in the tree.

One embodiment not addressed by the simple pseudo-code of findmatch( )) is an instance in which one query is a prefix of another. The tree data structure may be augmented to mark interior tree nodes that constitute the end of a query. For example, in matching tree 900 from FIG. 9, adding a query A=1 and B=4, which is a prefix of the existing query A=1 and B=4 and C=3, would not cause any structural changes to the matching tree 900, but the second-level node representing B=4 should be marked as the terminal of a query, even though it is not a leaf.

The pseudo code from FIG. 11 recognizes a match when it reaches a physical tree leaf, but it may be modified to also recognize matches when the process reaches an internally marked terminal.

FIG. 12 is a schematic diagram illustrating exemplary pseudo code 1200 for determining an internally marked terminal in the process of matching against a matching tree, in accordance with the present disclosure. This pseudo code may be combined with the pseudo code of FIG. 11 to allow for process 1000 (from FIG. 10) to declare a match at action 1011 when either a leaf node or a query terminus matches at action 1009.

Additional modifications to the matching pseudo code may also be included. In an embodiment, the pseudo code includes a routine for reporting a match found (rather than just reporting an absence of a match). In another embodiment, the pseudo code includes a routine to find all query matches for a particular message input.

FIG. 13 is a flow diagram illustrating a process 1300 for matching a matching tree to a message at receiver machine 103. Process 1300 begins at the root of the tree at action 1301 and determines whether successive field nodes within the tree node may have a match in the message at decision 1302. If a match is found at decision 1302, the child of that field node may be recursively checked at action 1304. If a match is not found at decision 1302, the process may iterate to the next field node within the tree node at action 1310 and may start over at decision 1302. As with the previous matching method, a match is declared at action 1308 if it is determined that a leaf node or query terminus is matched at decision 1306. If a leaf node or query terminus is not matched at decision 1306, the process may iterate to the next field node at action 1310 and may start over at decision 1302.

In an embodiment, the time to match a field node to a query may be optimized in cases where the field node is associated with multiple values, such as the A field node 602 in FIG. 9, which is associated with the values 607, 702 of 1 and 2, respectively. To optimize performance, the field node's 602 name may be matched to a query, and, if there is a match, the message's field name and/or value combination may be matched to the field node. In other embodiments, this latter comparison may be improved through the use of hashing data structures. When the field node has many associated values, this may be significantly faster than simply comparing each field name/value from the field node to the message.

Depending on the number of field nodes within a tree node and the number of field/value pairs in the message (or whatever tail thereof remains), it may be more efficient to use one or the other of the above matching processes. A hybrid process may be used to evaluate a balance at each level of recursion and use the more efficient comparison. Referring back to FIG. 1, query processing engine 135 within query application 133 of receiver machine 103 may perform this decision on a node-by-node basis during message matching evaluation. Alternatively, the decision may be performed over network 140 and may perform this decision on a node-by-node basis during message matching evaluation.

While various embodiments have been described above, it should be understood that they have been presented by way of example only, and not limitation. Thus, the breadth and scope of a preferred embodiment should not be limited by any of the above described exemplary embodiments, but should be defined only in accordance with the claims and their equivalents for any patent that issues claiming priority from the present provisional patent application.

For example, as referred to herein, a machine or engine may be a virtual machine, computer, node, instance, host, or machine in a networked computing environment. Also as referred to herein, a networked computing environment is a collection of machines connected by communication channels that facilitate communications between machines and allow for machines to share resources. Also as referred to herein, a server is a machine deployed to execute a program operating as a socket listener and may include software instances.

Resources may encompass any types of resources for running instances including hardware (such as servers, clients, mainframe computers, networks, network storage, data sources, memory, central processing unit time, scientific instruments, and other computing devices), as well as software, software licenses, available network services, and other non-hardware resources, or a combination thereof.

A networked computing environment may include, but is not limited to, computing grid systems, distributed computing environments, cloud computing environment, etc. Such networked computing environments include hardware and software infrastructures configured to form a virtual organization comprised of multiple resources which may be in geographically disperse locations.

While communication protocols may be described herein, the coverage of the present application and any patents issuing there from may extend to other local-area network, wide-area network, or other network operating using other communications protocols.

Services and applications are described in this application using those alternative terms. Services can be java services or other instances of operating code. A service/application is a program running on a machine or a cluster of machines in a networked computing environment. Services may be transportable and may be run on multiple machines and/or migrated from one machine to another.

Various terms used herein have special meanings within the present technical field. Whether a particular term should be construed as such a "term of art," depends on the context in which that term is used. "Connected to," "in communication with," or other similar terms should generally be construed broadly to include situations both where communications and connections are direct between referenced elements or through one or more intermediaries between the referenced elements, including through the Internet or some other communicating network. "Network," "system," "environment," and other similar terms generally refer to networked computing systems that embody one or more aspects of the present disclosure. These and other terms are to be construed in light of the context in which they are used in the present disclosure and as those terms would be understood by one of ordinary skill in the art would understand those terms in the disclosed context. The above definitions are not exclusive of other meanings that might be imparted to those terms based on the disclosed context.

Words of comparison, measurement, and timing such as "at the time," "equivalent," "during," "complete," and the like should be understood to mean "substantially at the time," "substantially equivalent," "substantially during," "substantially complete," etc., where "substantially" means that such comparisons, measurements, and timings are practicable to accomplish the implicitly or expressly stated desired result.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically and by way of example, although the headings refer to a "Technical Field," such claims should not be limited by the language chosen under this heading to describe the so-called technical field. Further, a description of a technology in the "Background" is not to be construed as an admission that technology is prior art to any invention(s) in this disclosure. Neither is the "Brief Summary" to be considered as a characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings set forth herein.

What is claimed is:

1. A method for efficient content-based routing, the method comprising:
   receiving, at a sender machine, a subscription of requested content requested by a receiver machine;
   assigning a unique subscription identification (ID) identifying the requested content and associated with the subscription in a router table;
   prior to sending a message, placing, by the sender machine, the subscription ID in a header of the message if the message corresponds to the requested content;
   analyzing the router table to determine one or more receiver machines associated with the requested content identified by the subscription ID in the header of the message; and
   sending, from the sender machine, one or more messages to the one or more receiver machines associated with the requested content identified by the subscription ID in the header of the message.

2. The method of claim 1, wherein the one or more messages are sent over a network of one or more routers operable to analyze the subscription ID in the header of the one or more messages.

3. The method of claim 1, wherein the router table comprises one or more entries comprising:
   the subscription;
   the subscription ID associated with the subscription; and
   a receiver machine ID associated with the receiver machine subscribing to the subscription.

4. The method of claim 1, further comprising:
   not sending, from the sender machine, the one or more messages to the one or more receiver machines not associated with the subscription ID in the header of the message.

5. The method of claim 1, wherein the subscription ID is an integer.

6. The method of claim 1, wherein the subscription comprises one or more fields and one or more values, wherein the one or more fields are associated with a category of content, and wherein the one or more values are associated with a particular type of content.

7. The method of claim 1, wherein the subscription is for a particular sports magazine and the subscription ID associated with the subscription is 77.

8. The method of claim 1, wherein the router table is located at one of the one or more middleware servers.

9. The method of claim 1, wherein the sender machine communicates with the receiver machine through a peer to peer (P2P) network.

10. The method of claim 1, wherein the router table is located at the sender machine.

11. The method of claim 1, wherein the sender machine is a middleware server.

12. The method of claim 1, wherein the receiver machine is a middleware server.

13. A system for efficient content-based routing, the system comprising:
   a sender machine configured to:
      receive a subscription of requested content requested by a receiver machine;
      assign a unique subscription identification (ID) identifying the requested content and associated with the subscription in a router table;
      prior to sending a message, place the subscription ID in a header of the message if the message corresponds to the requested content;
      analyze the router table to determine one or more receiver machines associated with the requested content identified by the subscription ID in the header of the message; and
      send one or more messages to the one or more receiver machines associated with the requested content identified by the subscription ID in the header of the message.

14. The system of claim 13, wherein the one or more messages are sent over a network of one or more routers operable to analyze the subscription ID in the header of the one or more messages.

15. The system of claim 13, wherein the router table comprises one or more entries comprising:
   the subscription;
   the subscription ID associated with the subscription; and
   a receiver machine ID associated with the receiver machine subscribing to the subscription.

16. The system of claim 13, further comprising:
   not sending, from the sender machine, the one or more messages to the one or more receiver machines not associated with the subscription ID in the header of the message.

17. The system of claim 13, wherein the subscription ID is an integer.

18. The system of claim 13, wherein the subscription comprises one or more fields and one or more values, wherein the one or more fields are associated with a category of content, and wherein the one or more values are associated with a particular type of content.

19. The system of claim 13, wherein the subscription is for a particular sports magazine and the subscription ID associated with the subscription is 77.

20. The system of claim 13, wherein the router table is located at one of the one or more middleware servers.

21. The system of claim 13, wherein the sender machine communicates with the receiver machine through a peer to peer (P2P) network.

22. The system of claim 13, wherein the router table is located at the sender machine.

23. The system of claim 13, wherein the sender machine is a middleware server.

24. The system of claim 13, wherein the receiver machine is a middleware server.

25. Logic for deploying an application, the logic being embodied in a non-transistory computer readable medium and when executed operable to:
   receive a subscription of requested content requested by a receiver machine;
   assign a unique subscription identification (ID) identifying the requested content and associated with the subscription in a router table;
   prior to sending a message, place the subscription ID associated with a particular subscription in a header of the message if the message corresponds to the requested content;
   analyze the router table to determine one or more receiver machines associated with the requested content identified by the subscription ID in the header of the message; and send one or more messages to the one or more receiver machines associated with the requested content identified by the subscription ID in the header of the message.

\* \* \* \* \*